US011415438B2

(12) United States Patent
Khoury et al.

(10) Patent No.: US 11,415,438 B2
(45) Date of Patent: Aug. 16, 2022

(54) INTELLIGENT SYSTEM FOR IDENTIFYING SENSOR DRIFT

(71) Applicant: ExxonMobil Technology and Engineering Company, Annandale, NJ (US)

(72) Inventors: George A. Khoury, Beaumont, TX (US); Erin S. Percell, Tomball, TX (US); Mohsen N. Harandi, New Hope, PA (US); Nicholas W. Silvestri, Spring, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 94 days.

(21) Appl. No.: 16/930,786

(22) Filed: Jul. 16, 2020

(65) Prior Publication Data

US 2021/0018347 A1 Jan. 21, 2021

Related U.S. Application Data

(60) Provisional application No. 62/875,142, filed on Jul. 17, 2019.

(51) Int. Cl.
*G01D 21/02* (2006.01)
*G06N 3/04* (2006.01)
*G06N 3/08* (2006.01)

(52) U.S. Cl.
CPC ........... *G01D 21/02* (2013.01); *G06N 3/0445* (2013.01); *G06N 3/08* (2013.01)

(58) Field of Classification Search
CPC ........ G01D 21/02; G01D 3/08; G06N 3/0445; G06N 3/08
See application file for complete search history.

(56) References Cited

U.S. PATENT DOCUMENTS 7,349,746 B2 3/2008 Emigholz et al.
7,533,070 B2 5/2009 Guralnik et al.
(Continued)

FOREIGN PATENT DOCUMENTS

CA 2649863 C 9/2013
EP 1810162 A2 7/2007

OTHER PUBLICATIONS

Ding et al., On-line Error Detection and Mitigation for Time-series Data of Cyber-physical Systems using Deep Learning based Methods, 2019 (Year: 2019).*

(Continued)

*Primary Examiner* — Mohammad K Islam
(74) *Attorney, Agent, or Firm* — Vorys, Sater, Seymour and Pease LLP

(57) ABSTRACT

A method for identifying sensor drift can include: setting an autocorrelation threshold for a sensor in a long-short term memory (LSTM) model developed based on historical process measurements from an analogous sensor to a sensor; collecting measured data from the sensor; applying the LSTM model to the measured data from the sensor, wherein applying the LSTM model comprises: applying the LSTM model to the measured data from the sensor to yield LSTM predicted data; calculating key performance indicators (KPIs) of the LSTM data based on an accumulated slow drift error (ASDE) model, wherein the KPIs comprise an error, an accumulated prediction error, an accumulated slow-drift error, and an estimated autocorrelation; and identifying sensor drift when the estimated autocorrelation violates the autocorrelation threshold.

17 Claims, 4 Drawing Sheets

(56) References Cited

U.S. PATENT DOCUMENTS

| | | |
|---|---|---|
| 7,567,887 B2 | 7/2009 | Emigholz et al. |
| 9,261,615 B2 | 2/2016 | Kumaran |
| 2005/0141782 A1 | 6/2005 | Guralnik et al. |
| 2006/0074598 A1 | 4/2006 | Emigholz et al. |
| 2012/0330631 A1 | 12/2012 | Emigholz |
| 2016/0065656 A1 | 3/2016 | Patin et al. |
| 2019/0325328 A1* | 10/2019 | Katz ................. G06F 17/14 |

OTHER PUBLICATIONS

Singh, Anomaly Detection for Temporal Data using Long Short-Term Memory (LSTM), 2017 (Year: 2017).*

Filonov, et al; "Multivariate Industrial Time Series with Cyber-Attack Simulation: Fault Detection Using an LSTM-based Predictive Data Model", 2016, Techonology Research Dept., Future Technologies Kaspersky Lab.

\* cited by examiner

INTELLIGENT SYSTEM FOR IDENTIFYING SENSOR DRIFT

CROSS REFERENCE TO RELATED APPLICATIONS

This application claims priority to U.S. Provisional Application Ser. No. 62/875,142 filed Jul. 17, 2019, which is herein incorporated by reference in its entirety.

BACKGROUND

The present disclosure relates to preventing the escalation of process and equipment problems into serious incidents by more accurately identifying abnormal events.

In the petrochemical industry, abnormal operations can have a significant economic impact (e.g., lost production and/or equipment damage), can cause environmental releases, and, in more severe cases, can endanger human life. An industrial consortium has estimated that abnormal events can cost between 3% and 8% of production capacity, which is over $10 billion for the US petrochemical industry.

Abnormal situations commonly result from the failure of field devices (e.g., sensors, instrumentation, control valves, and pumps) or some form of process disturbance that causes the plant operations to deviate from the normal operating state. In particular, the undetected failure of key instrumentation and other devices, which are part of the process control system can cause the control system to drive the process into an undesirable and dangerous state. Early detection of these failures enables the operations team to intervene before the control system escalates the failure into a more severe incident.

Events and disturbances of various magnitudes are constantly affecting process operations. Most of the time these events and disturbances are handled by a process control system. However, the operator is required to make an unplanned intervention in the process operations whenever the process control system cannot adequately handle the process event. This situation is an abnormal operation caused by an abnormal event.

For example, refineries and chemical plants employ an abnormal event detection (AED) process. Generally, the AED process relies on correlating one process variable to another set of process variables. Statistical criteria and linear models such as principal component analysis (PCA) or partial least squares (PLS) are used to identify abnormal events based on such a correlation. That is, the AED process based on statistical criterial and linear models attempt to infer what the sensor reading should be from other process measurements. Thus, the models require multiple variables in order to perform predictions of what a sensor reading should be with the overarching theory that if the predicted sensor reading mismatches the actual sensor reading, something is wrong.

However, if the relationship between the predicted sensor reading and the other variable is not linear, AED processes intrinsically will be challenged because at the core of such AED processes are the linear models.

Drift is a natural phenomenon for sensors and is caused by physical changes to the sensor. Such physical changes can come from a variety of sources like exposure to contaminants or corrosive chemicals, temperature fluctuations, changes in relative humidity, and the like. Correcting sensor drift is done by recalibrating the sensor. Sensor drift is not a linear process and can lead to false alarms in AED processes based on statistical criterial and linear models.

SUMMARY

The present disclosure relates to preventing the escalation of process and equipment problems into serious incidents by improving the accuracy of a measurement made by a sensor. More specifically, the present disclosure identifies sensor drift using an intelligent system that leverages deep neural network machine learning, graphics processing unit (GPU) processing, statistics, and process knowledge. The underlying model uses historical data to learn the natural rhythm of a process variable (what the sensor detects) and identifies when that rhythm is deviated from as sensor drift. By distinguishing this as sensor drift over abnormal events, fewer false alarms are identified.

A method can comprise: collecting historical process measurements from an analogous sensor to a sensor; developing a long-short term memory (LSTM) model, wherein developing comprises: selecting training data from the historical process measurements from the analogous sensor; creating lookback dataset from the training data with an interval of 5 to 100; defining a topology of the LSTM model; and training a LSTM network of the LSTM model with the lookback dataset and the topology; and setting an autocorrelation threshold for the sensor in the LSTM model.

Another method can comprise: setting an autocorrelation threshold for a sensor in a long-short term memory (LSTM) model developed based on historical process measurements from an analogous sensor to a sensor; collecting measured data from the sensor; applying the LSTM model to the measured data from the sensor, wherein applying the LSTM model comprises: applying the LSTM model to the measured data from the sensor to yield LSTM predicted data; calculating key performance indicators (KPIs) of the LSTM data based on an accumulated slow drift error (ASDE) model, wherein the KPIs comprise an error, an accumulated prediction error, an accumulated slow-drift error, and an estimated autocorrelation; and identifying sensor drift when the estimated autocorrelation violates the autocorrelation threshold. Such a method can optionally be performed in conjunction with the previous method.

A computing device can comprise: a processor; a memory coupled to the processor; and instructions provided to the memory, wherein the instructions are executable by the processor to perform any of the foregoing methods.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to preventing the escalation of process and equipment problems into serious incidents by more accurately distinguishing sensor drift from abnormal events. More specifically, the present disclosure identifies sensor drift using a long-short term memory (LSTM) model that leverages deep neural network machine learning, graphics processing unit processing, statistics, and process knowledge. The underlying LSTM model uses historical data to learn the natural rhythm of a process variable (what the sensor detects). Then, the LSTM model in conjunction with an accumulated slow drift error (ASDE) model can assess newly acquired measurements and identify when the natural rhythm of the process is deviated. In contrast, current AED processes use an absolute number threshold in the statistical criterial and linear models where measurements that are beyond the threshold because of sensor drift are not distinguished from abnormal events. Accordingly, by using a threshold that relates to the natural rhythm of the process rather than a static number threshold, the accuracy of identifying abnormal events is increased. Accordingly, the methods and systems of the present disclosure improve the operation of sensors and control systems related thereto. Because abnormal events are identified with greater accuracy, such thresholds can be less conservative. Accordingly, the related systems and processes can be operated with higher efficiency, thereby saving money without sacrificing safety and environmental reliability.

Figure 1:
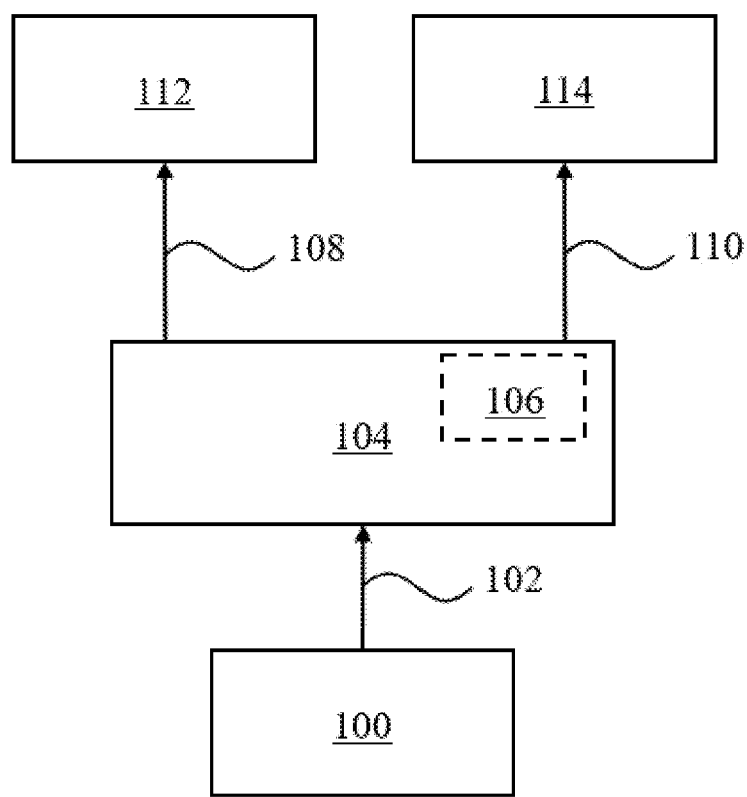
FIG. 1 shows a schematic diagram of implementing LSTM models in an AED process.

FIG. 1 shows a schematic diagram of implementing LSTM models in an AED process. A sensor 100 is in communication with an AED process control system 104, which receives data 102 from the sensor 100. The AED process control system 104 includes and/or operates together with an abnormal event identification system 106 uses an LSTM model in conjunction with an ASDE model to distinguish between abnormal events 108 and sensor drift 110. That is, the LSTM model in conjunction with the ASDE model identifies sensor drift 110, which would indicate an abnormal event at that time is a false alarm due to sensor drift. Accordingly, when sensor drift 110 is identified, the AED process control system 104 can cause a sensor drift alarm 114. When an abnormal event 108 not corresponding to sensor drift 110 is identified, the AED process control system 104 can cause an abnormal event alarm 112, which is addressed accordingly depending on the abnormal event 108 in the process. By properly distinguishing abnormal events 108 and sensor drift 110, fewer abnormal event alarms 112 are false alarms.

The cause of the sensor drift could be normal operational drift or an indication of sensor failure. Accordingly, when the sensor drift alarm 114 is triggered, the sensor 100 can be recalibrated. If the sensor drift alarm 114 persists, the sensor could be failing and replacement is warranted.

In most industrial processes, sensors are implemented in multiplates (e.g., duplicates, triplicates, and so on). Accordingly, the frequency of the sensor drift alarm for each sensor can be compared where a sensor having more frequent sensor drift alarms may indicate that the sensor is failing. By providing operating engineers with an early indicator of potential sensor failure, the escalation of process and equipment problems into serious incidents can be minimized.

As used herein, the term "alarm" refers to an alert, which can be provided to a control system and/or to operating engineers, for example. For example, a sensor drift alarm may alert a control system to recalibrate the corresponding sensor. Then, if additional sensor drift alarms are triggered with increasing frequency, an operating engineer may be altered to more closely analyze the condition of the corresponding sensor. In some instances, the operating engineer may take that sensor offline and rely on other sensors until the processes cease and sensor replacement can be achieved.

Alarms can be in any suitable form including, but not limited to, a communication to control system, an audible alarm, a visual alarm (e.g., an indicator light or message banner), and the like, and any combination thereof.

LSTM Model Development

With continued reference to FIG. 1, before implementation of the LSTM model in the abnormal event identification system 106, the LSTM model is developed based on historical process measurements for an analogous sensor to the sensor 100. An analogous sensor measures the same data (e.g., pressure, temperature, chemical component concentration, and the like) as the sensor 100. Preferably, the analogous sensor is a similar model to the sensor 100. More preferably, the analogous sensor is the same model as the sensor 100.

Historical process measurements on a second, minute, hour, daily, weekly (or any time period in between) scale are collected for the purposes of building the model.

Developing the LSTM model includes selecting training data from the historical process measurements from the analogous sensor, creating lookback dataset from the training data with a desired interval, reshaping the training data into a 3-dimensional tensor (e.g., [sample, time step, feature]), defining a topology of the LSTM model, and training a LSTM network of the LSTM model with the lookback dataset and the topology. Optionally, the historical process measurements, training data, and/or lookback dataset can be normalized to fall between specific values (e.g., 0 and 1). This normalization improves the numerical performance of the learning algorithms used to train the LSTM network.

The lookback data set can have an interval size of 5 to 100, or 5 to 50, or 10 to 30. Selection of the interval depends on the relevant timescale where changes can be measured in the process and how much fidelity is needed.

The features of the 3-dimensional tensor can be a previous measurement from the analogous sensor. Alternatively, the feature can be multiple features from previous measurements of multiple analogous sensors.

The topology of the LSTM model can include parameters like type of loss function and number of layers.

The number of epochs can be between 1 and 1 billion, and training algorithms will likely converge when the training/testing error is minimized to a user-defined limit.

The batch size is set to be a number less than the number of samples. Selection of the batch size depends on how similar the data is to each other. Adapting the batch size impacts the accuracy of the gradient during optimization of the neural network.

The type of loss function can be a mean-square root, mean absolute error, hinge, binary cross-entropy, mean-squared logarithmic error, or the like. Selection of the loss function depends on which technique minimizes the error and results in the best model.

The number of neural network layers can be between 1 to 1000. Selection of the number of neural network layers depends on the size of the dataset and complexity of the pattern to be learned, where increasing the number of layers can improve the accuracy of the model at the expense of additional computational cost, traditionally requiring the use of a GPU.

After training the LSTM network of the LSTM model with the lookback dataset and the topology, the LSTM model can optionally be evaluated for accuracy. One method for testing accuracy is to select validation data from the historical process measurements (preferably that is not overlapping the training data) and running the LSTM model to predict measurements in the validation data. A resultant $R^2$ value of a predicted value and true value cross-plot is a measure of the accuracy of the LSTM model. Preferably, before implementation, the $R^2$ value is greater than 0.80, or greater than 0.85, or greater than 0.90. If needed, the training of the LSTM can be continued based on additional lookback datasets and the topology to achieve a desired $R^2$ value before implementing the LSTM model in an abnormal event identification system.

Abnormal Event Identification System

The abnormal event identification system uses an LSTM model in conjunction with an ASDE model to identify sensor drift so that it can be distinguished from true abnormal events.

In general, it is recognized that there are a variety of reasons a model and a measurement can deviate from each other. Often, deviations fluctuate with fast timescales. However, sensor drift is a slow timescale phenomenon, which the ASDE model can track. The ASDE model can be defined by several metrics that include error and accumulated error.

Error per the following equation is the difference between a measured value ($Y_{meas}$) from the sensor and modeled value ($Y_{model}$) from the LSTM model at a particular timepoint i.

$$\text{Error}(i) = Y_{meas}(i) - Y_{model}(i)$$

Accumulated error (AE) per the following equation is the sum of the errors until the current time sample at time t. $N_{samples}(t)$ is the number of samples from the beginning of measurements up until the latest time sample.

$$AE(i) = \sum_{i=1}^{N_{samples}(t)} \text{Error}(i) \mid t = currentSample$$

ASDE per the following equation is the accumulated error such that the error has risen only by a certain threshold relative to the running average (Mean) and running standard deviation ($\sigma$) of the values between the present timepoint i and a predefined number of samples (Window). SLOW per the following equation is the set of samples i that meet this threshold. In other words, ASDE only rises when the current error is below a certain threshold that is near the recent running average of the errors up until that point. This way, sudden spikes in error will not bias the accumulated error, which allows for the detection of slow sensor drift over time.

$$ASDE(i) = \sum_{i \in SLOW}^{Window} (AE(i) - AE(i-1) + ASDE(i-1))$$

$$SLOW \mid : AE(i) - AE(i-1) <$$

$$\text{Mean}(\text{Error}(i - \text{Window}):\text{Error}(i)) - 0.1\sigma(\text{Error}(i - \text{Window}):\text{Error}(i))$$

A threshold (X), which in the equation above is set to −0.1, can be chosen as a factor to multiply by the standard deviation ($\sigma$). This factor can be tuned and helps minimize false positive detection.

Therefore, if the difference between the accumulated error of sample i and the previous sample i−1 is less than Mean(Error(i−Window):Error(i))−0.1σ(Error(i−Window): Error(i)), the sample i is included into the set SLOW. This is evaluated for all the samples being considered.

The predefined number of samples can be 100 to 100,000,000. Selection of the predefined number of samples depends on the time to steady state of the process relative to the timescale of the process data snapshots.

Figure 2:
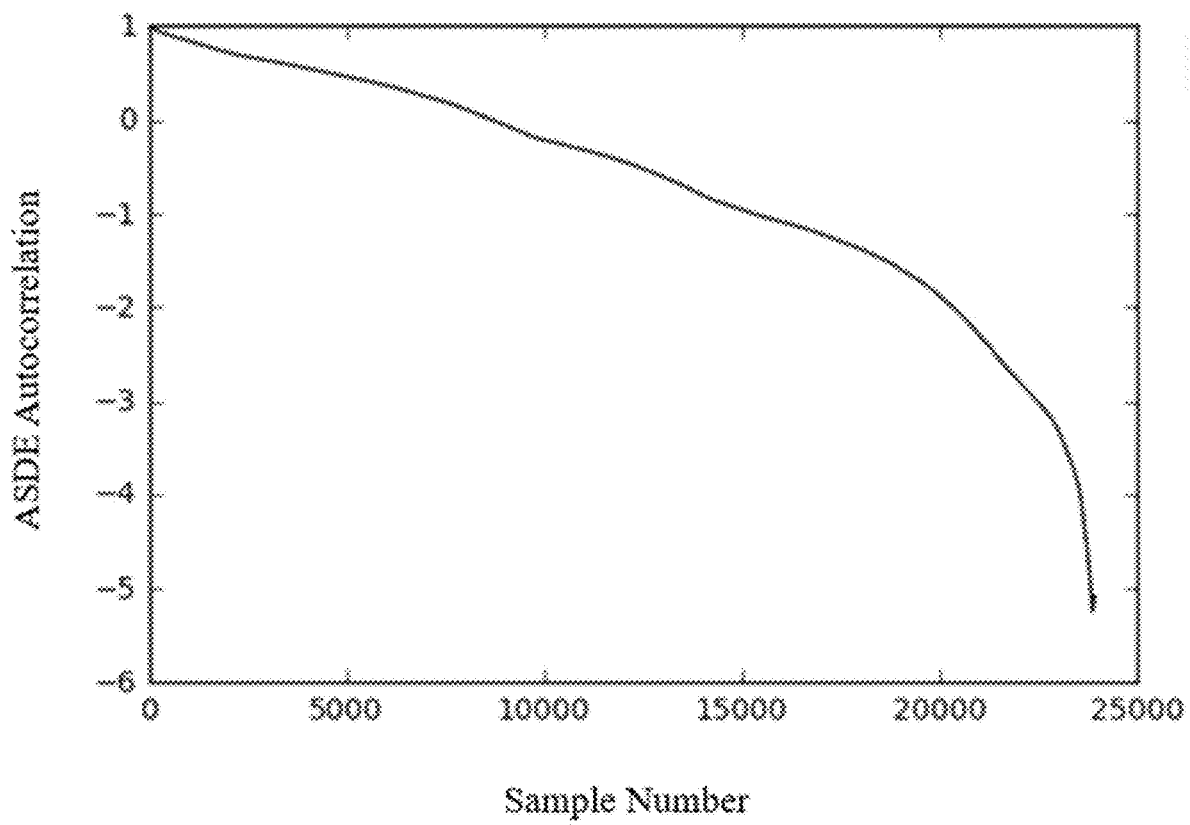
FIG. 2 illustrates an example ASDE autocorrelation as a function of sample number for a non-drifting sensor.
Figure 3:
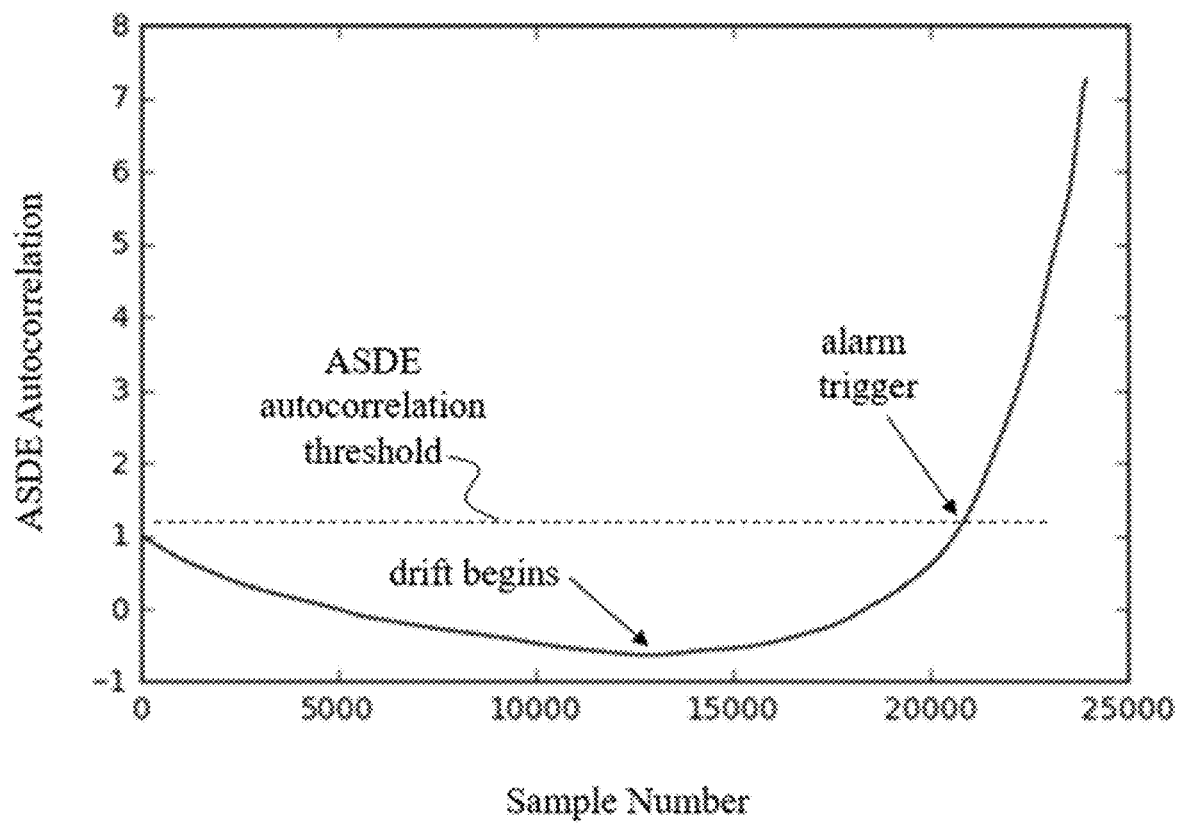
FIG. 3 illustrates an example ASDE autocorrelation as a function of sample number for a drifting sensor.

In the methods and systems described herein, autocorrelation is used to identify mismatches between the measured rhythm of the process and modeled rhythm of the process. Autocorrelation provides an indication of the similarity between the measurements as a function of the time lag between the measurements. Accordingly, measurements close in time should have higher autocorrelations than measurements further apart in time. When no drift is occurring, the autocorrelation of the ASDE should decrease in a generally monotonic manner as illustrated in FIG. 2. However, if sensor drift is occurring, the autocorrelation of the ASDE begins to increase over long timescales as illustrated in FIG. 3. Therefore, an ASDE autocorrelation threshold can be set, which when violated can trigger an alarm. When the data is normalized to values between 0 and 1, for example, the ASDE autocorrelation threshold can be a value greater than 1 (e.g., 1.01 to 1.5, or 1.05 to 1.25, or 1.1 to 1.2), where values closer to 1 have greater sensitivity to potential sensor drift.

Computer Systems

Various aspects of the systems and methods described herein utilize computer systems, for example, when training the LSTM model and when implementing LSTM model in conjunction with the ASDE model. Such systems and methods can include a non-transitory computer readable medium containing instructions that, when implemented, cause one or more processors to carry out the methods described herein.

"Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like. Accordingly, exemplary embodiments of the present systems and methods may be considered to include a tangible storage medium or tangible distribution medium and prior art-recognized equivalents and successor media, in which the software implementations embodying the present techniques are stored.

The methods described herein can be performed using control systems (e.g., computing devices or processor-based devices) that include a processor; a memory coupled to the processor; and instructions provided to the memory, wherein the instructions are executable by the processor to perform the methods described herein. The instructions can be a portion of code on a non-transitory computer readable medium. Any suitable processor-based device may be utilized for implementing all or a portion of embodiments of the present techniques, including without limitation personal computers, networks personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

Communication between sensors, control systems, and other components of the systems can be wired or wireless.

Applications

The systems and methods described herein may be suitable for use with a variety of different types of processes and process units within an industrial plant, such as those in the petroleum or petrochemical industry. The systems and methods described herein can be applied to a variety of sensors to detect sensor drift. Examples of sensors include those that measure a process condition including, but not limited to, vibrations, fluid flow, temperature, pressure, chemical composition (e.g., contaminant levels, concentration of a specific compound, or relative concentrations of two or more chemical compounds), and the like, and any combination thereof.

Nonlimiting examples of processes that can benefit from implementation of the models described herein with the corresponding sensors include, but are not limited to, the following processes.

Valves—The relationship between a valve output signal (OP) and associated process variables (PV) can be monitored to proactively detect valve wear (e.g., erosion), thus minimizing negative impacts of degenerative valve performance. One specific implementation is for planning the maintenance and valve replacements to occur during a turnaround. In anther example, the systems and methods described herein can be used in conjunction with control performance monitoring data such as oscillations, unit stability, or valve travel to more accurately detect abnormalities in control performance, which indicates control valve performance deterioration and potential failure. In yet another nonlimiting example, drifting of the accumulated error between the expected flow indication vs. valve output indication model can indicate valve wear. By more accurately identifying drift with few false alarms, a more accurate estimation of the valve wear can be achieved.

Hydrogen compressors—Detecting the potential for hydrogen compressor failure is especially useful for hydroprocessing units (e.g., scanfiners) when working to achieve the required sulfur content. If the compressor fails, the refinery cannot produce gasoline because the necessary hydrogen source is unavailable to react with the sulfur. By way of nonlimiting example, the systems and methods described herein can be used in conjunction with sensors on a compressor to more accurately detect abnormalities in the compressor, which indicates the compressor may trip.

Continuous catalytic reforming and other reformer compressors—When hydrogen supply compressors fail, the refinery lacks hydrogen potentially resulting in reduced throughput and ultimately plant shutdown. By way of nonlimiting example, the systems and methods described herein can be used in conjunction with sensors on a compressor to more accurately detect abnormalities in the compressor, which indicates the compressor may trip.

Multi-stage hydrocracker compressors—Because these compressors include many stages, if one goes down, repairs must be made. Due to multi-stage nature, these compressors very susceptible to reliability issues. By way of nonlimiting example, the systems and methods described herein can be used in conjunction with sensors on a compressor to more accurately detect abnormalities in the compressor, which indicates the compressor may trip.

Refining equipment—Several sensors are used in various stages of refining including, but not limited to, infrared (IR) cameras, oxygen sensors, temperature sensors, pressure sensors, and the like. By way of nonlimiting example, the systems and methods described herein can be used in conjunction with such sensors to more accurately detect abnormalities in thermal imaging, oxygen concentrations, temperature, pressure, and the like. One skilled in the art would recognize how an abnormality in each of the foregoing could indicate one or more of maldistribution of erosion, corrosion, fouling, and the like.

Detect land mass/ocean anomalies—The detection of anomalies in land masses and sub-ocean geological structures may allow for more accurate detection of where to drill with intention to get a "hit" more often and less dry holes. By way of nonlimiting example, the systems and methods described herein can be used in conjunction with thermal, satellite, or radio wave sensors to more accurately detect abnormalities in density, landmass, or topography which indicates oil or gas may be present.

Pipelines—Sensors for pipeline integrity are often sparsely placed along pipelines. By way of nonlimiting example, the systems and methods described herein can be used in conjunction with acoustic sensors, pressure sensors, or flow sensors to more accurately detect abnormalities, which can indicate a pipeline weak point that may potentially fail. Additionally it can be used to identify a small leak in a pipeline. This application can be important in mining or oil-sands facilities.

Quench towers and high temperature heat exchangers—Detecting leaks in quench towers/high temperature heat exchangers in a hydrogen plant and steam cracker furnace is important for mitigating explosions relative to the hydrogen. By way of nonlimiting example, the systems and methods described herein can be used in conjunction with temperature, pressure, or flow sensors to more accurately detect abnormalities in the signals, which indicates a potential leak.

Heat exchangers—A heat exchanger internal leak can be mis-characterized as a performance increased or decreased rate of fouling due to resultant direct contact heat exchange between hot and cold fluid (contamination). Moreover, a relatively small leak may not be easily noticed from available instrumentation, lab sampling strategy, and existing monitoring techniques. Timely detection of leaks is critical to avoid product quality incidents. Furthermore, the ability to more accurately detect exactly when a leak started assists engineers to pinpoint the cause of the leak and prevent reoccurrence. By way of nonlimiting example, the systems and methods described herein can be used in conjunction with temperature, pressure, or flow sensors to more accurately detect abnormalities in the heat exchanger measurements, which can indicate an internal leak in a heat exchanger.

Distillation tower—Flooding of a distillation tower occurs when a tray in the tower is so full that the fluid in the tray contacts a higher tray and contaminates the fluid in that tray. Tower flooding causes the quality of the distillate to be reduce, thereby reducing its value. By way of nonlimiting example, the systems and methods described herein can be used in conjunction with pressure, temperature, or acoustic sensors to more accurately detect abnormalities in the pressure drop across the tower, which indicates tower flooding. The systems and methods described herein are particularly useful here because the pressure drop is not constant and has a natural rhythm or fluctuation that can be accounted for in these models.

Washbed in a vacuum tower—Existing wash bed monitoring techniques are inadequate for proactive and timely detection of excessive coking in vacuum tower wash beds. The wash bed pressure differential is often used, but the onset of excessive coking is near impossible to detect in this manner due to the scale and noise of measurement. Measurements suggesting elevated pressure drop are often dismissed or deemed low risk. In real coking events, the initial increase in pressure drop is small and is easily mistaken for noise. Thermal cracking and coke formation in a wash bed has an exponential effect on pressure drop and timely detection is critical for any action to be effective at reducing coke production. Typical monitoring methods typically identify excessive coke production and deposition in the wash bed too late for effective mitigation or maintenance planning. By way of nonlimiting example, the systems and methods described herein can be used in conjunction with the wash bed pressure, and temperature difference ($\Delta T$) across the washbed sensors to more accurately detect abnormalities, which indicates the washbed may be coking.

Atmospheric tower flooding/fouling—The pressure difference ($\Delta P$) in different parts of the tower along with secondary measurements such as temperature profile can be used to detect abnormalities. By way of nonlimiting example, the systems and methods described herein can be used in conjunction with pressure, temperature, and/or acoustic sensors to more accurately detect abnormalities in the atmospheric tower, which indicates atmospheric tower flooding.

Reactors—Reactor catalyst activity and selectivity depends on distribution of reactants within the catalyst bed and, where a more homogeneous distribution of well-mixed reactants tends to maximize performance. However, poor catalyst loading strategy, foulant accumulation, and process disturbances can challenge even reactant distribution and lead to internal bypassing. Moreover, in the case of highly exothermic reactions (e.g., hydrocracking reactions) inadequate distribution of quench streams can lead to local hot spots and reactor runaway. Existing monitoring methods consist of several strategies, including internal temperature measurements from an array of thermocouples placed at discrete intervals along the reactor elevation. These measurements are not necessarily representative of the entire reactor temperature profile. By way of nonlimiting example, the systems and methods described herein can be used in conjunction with temperature sensors to more accurately detect abnormalities in temperatures of the reactor temperature profile, which can indicate chemical maldistribution and hot spots that cause less efficient reactor conditions.

Emissions—Continuous Emissions Monitoring Systems (CEMS) are often displayed on a time code display screen but are actually located in the stack close to the point of flue gas emission to the atmosphere. CEMS are used for government reporting of emissions. By way of nonlimiting example, the systems and methods described herein can be used in conjunction with CEMS to more accurately detect abnormalities in chemical compositions of emissions.

Furnaces—Flame Temperature—Optimum furnace operation desires the flame temperature to be run as hot as possible by minimizing the excess oxygen, with normal operation between 2 wt % and 4 wt % at refineries and chemical plants. Reduced excess oxygen maximizes combustion efficiency and minimizes unnecessary heating of unburned oxygen. Furnace flooding is characterized by excess fuel in the firebox relative to oxygen. In a typical design, process fluid outlet temperature is controlled by fuel gas supply (combustion rate), while excess oxygen is controlled either with a damper position or an air blower. An analyzer is installed in the stack that measures the excess oxygen that is uncombusted. By way of nonlimiting example, the systems and methods described herein can be used in conjunction with oxygen sensors to more accurately detect abnormalities in oxygen concentrations at the stacks of a furnace, which can indicate inefficient combustion in the furnace.

Furnaces—Oxygen Sensors—Oxygen sensor drift is a difficult fault to detect because it happens in very small increments over long time scales. When the sensor drifts (e.g., due to tramp air, air leaks, other issues), the process may seem to be operating normally when in fact there is less excess oxygen than required in the combustion zone. This leads to a safety risk since the furnace can approach the region where it is no longer fuel limited, but oxygen limited instead, and in this region the furnace can produce combustibles such as carbon monoxide. With a sudden rush of air with accumulated combustibles and excess fuel, this can lead to the furnace exploding. Because of these safety risks, furnaces are run farther from their optimum operating regime, leading to inefficient heating of additional excess $O_2$ (unnecessary OPEX), and additional $CO_2$ product produced. By identifying when a sensor is drifting, more accurate $O_2$ measurements are made.

Furnace—Coking—Coking is more commonly an issue for steam cracking, vacuum towers, and coker furnaces. Temperature measurements and/or pressure drop can be used to detect abnormalities, which is especially important for steam crackers, vacuum towers, and coker furnaces because each commonly coke. By way of nonlimiting example, the systems and methods described herein can be used in conjunction with temperature sensors and/or pressure sensors to more accurately detect abnormalities in temperature or pressure drop across the furnace, respectively, which indicates coking.

Example Embodiments

A first example embodiment of the present disclosure is a method comprising: collecting historical process measurements from an analogous sensor to a sensor; developing a long-short term memory (LSTM) model, wherein developing comprises: selecting training data from the historical process measurements from the analogous sensor; creating lookback dataset from the training data with an interval of 5 to 100; defining a topology of the LSTM model; and training a LSTM network of the LSTM model with the lookback dataset and the topology; and setting an autocorrelation threshold for the sensor in the LSTM model. Optionally, the method can further include one or more of the following: Element 1: wherein developing the LSTM model further comprises normalizing at least one of: the training data, the historical process measurements, and the lookback dataset; Element 2: wherein developing the LSTM model further comprises reshaping the training data into a 3-dimensional tensor; Element 3: wherein the topology has parameters that comprise a loss function and a number of layers; Element 4: Element 3 and wherein the loss function is selected from the group consisting of a mean-square root, a mean absolute error, a hinge, a binary cross-entropy, and a mean-squared logarithmic error; Element 5: the method further comprising: running the LSTM model to predict measurements in validation data; and Element 6: Element 5 and the method further comprising: redeveloping the LSTM model with additional historic process measurements until a R2 value of greater than 0.80 for a predicted value versus true value cross-plot is achieved. Examples of combinations include, but are not limited to, Element 1 in combination with one or more of Elements 2-6; Element 2 in combination with one or more of Elements 3-6; and Element 3 and optionally Element 4 in combination with one or more of Elements 5-6.

Another embodiment of the present disclosure is a method comprising: setting an autocorrelation threshold for a sensor in a long-short term memory (LSTM) model developed based on historical process measurements from an analogous sensor to a sensor; collecting measured data from the sensor; applying the LSTM model to the measured data from the sensor, wherein applying the LSTM model comprises: applying the LSTM model to the measured data from the sensor to yield LSTM predicted data; calculating key performance indicators (KPIs) of the LSTM data based on an accumulated slow drift error (ASDE) model, wherein the KPIs comprise an accumulated prediction error, an accumulated slow-drift error, and an estimated autocorrelation; and identifying sensor drift when the estimated autocorrelation violates the autocorrelation threshold. Optionally, the method can further include one or more of the following: Element 7: wherein the KPIs are based on parameters comprising a mean factor for a fraction of rolling standard deviation from a mean, a threshold for an estimated autocorrelation of accumulated slow drift prediction error, and predefined number of samples for a rolling mean and a rolling standard deviation; Element 8: the method further comprising: triggering an alarm when the sensor drift is identified; Element 9: the method further comprising: recalibrating the sensor when the sensor drift is identified; Element 10: the method further comprising: replacing the sensor when the sensor drift is identified; Element 11: the method further comprising: collecting the historical process measurements from the analogous sensor; developing the LSTM model, wherein developing comprises: selecting training data from the historical process measurements from the analogous sensor; creating lookback dataset from the training data with an interval of 5 to 100; defining a topology of the LSTM model; and training a LSTM network of the LSTM model with the lookback dataset and the topology; and setting an autocorrelation threshold for the sensor in the LSTM model; Element 11 and Element 1; Element 11 and Element 2; Element 11 and Element 3; Element 11 and Element 4; Element 11 and Element 5; and Element 11 and Element 6. Examples of combinations include, but are not limited to, one or more of Elements 7-10 in combination with Element 11 and optionally in further combination with one or more of Elements 1-6; Element 7 in combination with one or more of Elements 8-10; and two or more of Elements 8-10 in combination.

Yet another embodiment of the present disclosure is a computing device comprising: a processor; a memory coupled to the processor; and instructions provided to the memory, wherein the instructions are executable by the processor to perform any of the foregoing methods.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

The methods and systems of the present disclosure were simulated using the nonlimiting example above for using an oxygen sensor for monitoring the efficiency of furnace combustion.

Petroleum refining and chemicals manufacturing are the number 1 and 3 ranked industrial users of fired systems. Furnaces heat process material going to downstream units and must be carefully controlled to avoid flooding/explosions under normal conditions and also be able to counteract a variety of possible process upsets. This risk of flooding and explosion often leads to a conservative operating strategy characterized by oxygen injection in super-stoichiometric quantities. This leads to more excess oxygen heated than needed, which increases fuel consumption (worldwide order of magnitude ~$M/yr) and results in more carbon dioxide emitted (worldwide order of magnitude ~kTon/yr).

Optimum furnace operation desires the flame temperature to be run as hot as possible by minimizing the excess oxygen, with normal operation between 2 mol % to 4 mol % at refineries and chemical plants worldwide. Reduced excess oxygen maximizes combustion efficiency and minimizes unnecessary heating of unburned oxygen.

Furnace flooding is characterized by excess fuel in the firebox relative to oxygen. In a typical design, process fluid outlet temperature is controlled by fuel gas supply (combustion rate), while excess oxygen is controlled either with a damper position or an air blower. An analyzer is installed that measures the excess oxygen that is uncombusted (Stack $O_2$ analyzer).

The root issue is this oxygen analyzer and its reading can often be unreliable. The analyzer can drift slowly over time; the analyzer may read out a steady value of oxygen but in reality, the actual excess oxygen may be lower or higher than the measurement. This analyzer drift is difficult to detect with typical process monitoring methods.

The reported oxygen measurement can be higher than the actual value due to air leaks in the furnace. The furnace draft creates a vacuum and any gaps, punctures or holes in the firebox allow unmetered air into and out of the furnace. This can lead to tramp air (air that is not used for anything). This tramp air enters downstream of the burning (where the combustion happens near the flame), which increases the bias between excess oxygen reported by the analyzer and the excess oxygen at the point of combustion. This type of failure is difficult to detect and develops over longer periods of time, making it difficult for the naked eye or many monitoring programs to detect.

If there is insufficient oxygen to fully combust the fuel gas, instead of being fuel limited (excess $O_2$), combustion becomes $O_2$ limited. Unburned fuel may accumulate in the firebox, creating a fuel-rich atmosphere in a situation known as flooding or bogging. A return to stoichiometric oxygen quantities can be achieved by either decreasing fuel or increasing oxygen (air). However, adding more air can lead to sudden combustion (detonation) of the accumulated fuel. Additionally when the furnace is lean on air/oxygen, carbon monoxide (CO) is produced as a combustion byproduct rather than $CO_2$. CO is combustible and a sudden rush of air or the wrong control action can lead to an explosion.

The analyzer can also misread due to solids in the box, or plugging in the sample system. Thus, the analyzer can break, drift, or otherwise fail.

For training the LSTM model in this example, historical process measurements were collected at 1-minute intervals from an oxygen sensor in a stack of a combustion furnace.

A recurrent neural network model of the type Long Short Term Memory (LSTM) model was trained with 60% of the measurement data (the first 35,925 samples). The trained data is the region where the drift has not been induced in the virtual analyzer. The 1-dimensional dataset of measurements is converted into a two-column dataset. The first column, X contains the present measurement at a given time, t, and the second column contains the next measurement, Y, to be predicted, at time t+1, as shown in Table 1.

TABLE 1

| X(t) | Y(t + 1) |
|------|----------|
| 1    | 2        |
| 2    | 3        |
| 3    | 4        |
| ...  | ...      |

Different lookbacks can be used. For example, data with a lookback of 20 minutes has the format of Table 2.

TABLE 2

| X(t) | Y(t + 20) |
|------|-----------|
| 1    | 21        |
| 2    | 22        |
| 3    | 23        |
| ...  | ...       |
| 20   | 40        |
| 21   | 41        |
| ...  | ...       |

LSTM networks expect the data to be given in the format [samples, time steps, features], so the data is reshaped from being a 1-dimensional time-series array to a 3-dimensional tensor of the form: [samples, time steps, features]. In this example, only one type of feature (previous analyzer measurements/values) from a single analyzer is used, but in principle, more features from different analyzers can be used. The LSTM network is trained using Keras, TensorFlow, and a scikit-learn.

The topology of the network in this example is as follows. The network has a visibile layer with 20 inputs (1 analyzer*20 lookbacks), a hidden layer with 10 LSTM blocks/neurons, and an output layer that makes a single value prediction. In other words, the LSTM network uses the data from the previous 20 timesteps with its model to predict the next timestep. The network is trained using 5 epochs with a batch size of 1000. Depending on the problem, different numbers of epochs and batch sizes can be used, depending on the size and timescale of the dataset. The model is trained using a mean-squared error loss function with the Adam optimization algorithm. These settings can be changed for different problems but, preferably, provided the most general and consistent results.

The LSTM model is used to make predictions on the testing set in the scaled space, and then inverting the scaling. The LSTM model is then applied to predict the oxygen sensor value on the remaining 40% of the data (the remaining 23943 samples). The testing data is reshaped from being a 1-dimensional time-series array to a 3-dimensional tensor of the form: [samples, time steps, features]. It is important to note that in this example the training and testing data are completely separated with no knowledge of each other.

The ASDE model and ASDE autocorrelation analysis were performed on the data using −0.1 for the factor X in the SLOW equation and an ASDE autocorrelation threshold of 1.1.

Because this is a no drift example, the predicted and actual values were cross-plotted to determine if the LSTM model is sufficiently trained. The predicted vs. actual values plot has a $R^2$=0.864. Accordingly, the LSTM model was then implemented with data having a drift.

Using the same data from the oxygen sensor, sensor drift was induced at time point 51,252 according to the following formula. This effectively simulates a very slow and subtle analyzer drift mimicking an air leak or some other issue with the sampling system.

$$DRIFT_{O2}=MEASURED_{O2}+0.0002*i$$

Figure 4:
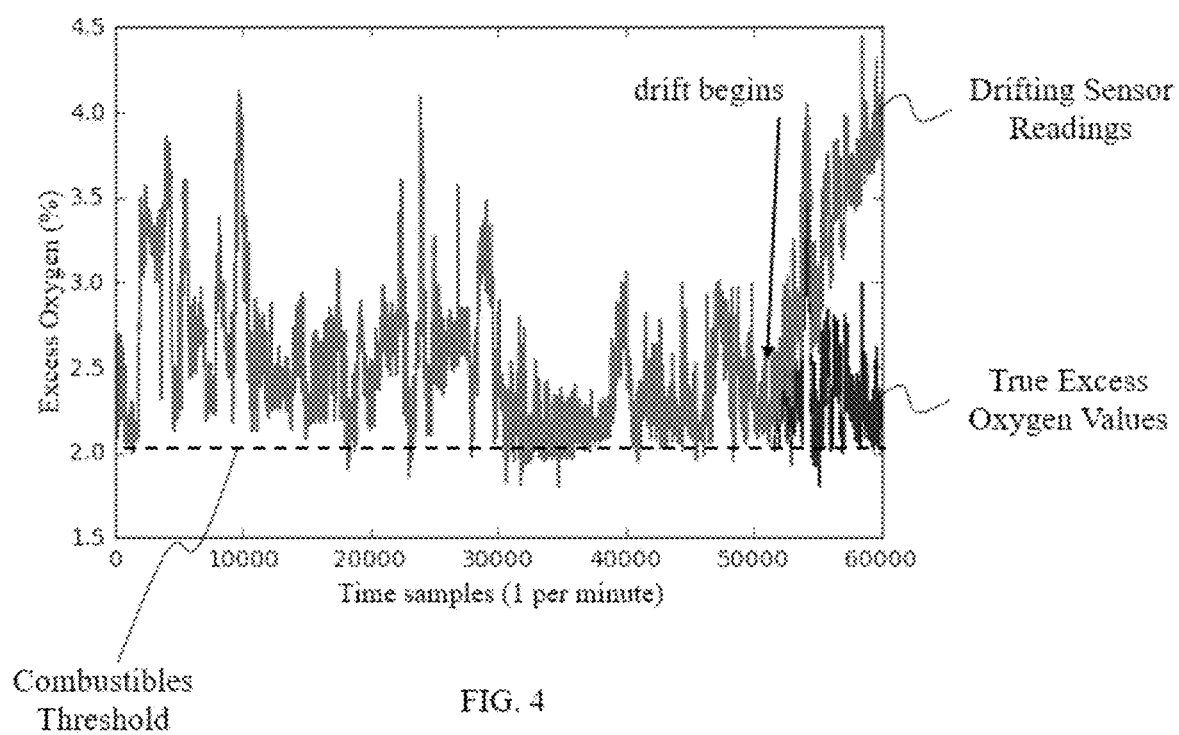
FIG. 4 is a plot illustrating the data for a sensor with an induced sensor drift.

FIG. 4 is a plot illustrating the data and induced sensor drift. Combustibles can form below a certain threshold of excess oxygen (e.g., 2 mol % as illustrated by the dashed horizontal like in FIG. 4). Because there is a risk of the analyzer drifting, furnaces are currently operated conservatively at excess oxygen levels that are well above the threshold (e.g., 5 mol % or greater).

The sensor drift became detectable 15,328 time points after inducing sensor drift (time point 51,252). The ASDE crosses 1.1 at 20,740 time points after inducing sensor drift (time point 51,252).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    collecting historical process measurements from an analogous sensor to a sensor;
    developing a long-short term memory (LSTM) model, wherein developing comprises:
        selecting training data from the historical process measurements from the analogous sensor;
        creating lookback dataset from the training data with an interval of 5 to 100;
        defining a topology of the LSTM model; and
        training a LSTM network of the LSTM model with the lookback dataset and the topology; and
    setting an autocorrelation threshold for the sensor in the LSTM model.

2. The method of claim 1, wherein developing the LSTM model further comprises normalizing at least one of: the training data, the historical process measurements, and the lookback dataset.

3. The method of claim 1, wherein developing the LSTM model further comprises reshaping the training data into a 3-dimensional tensor.

4. The method of claim 1, wherein the topology has parameters that comprise a loss function and a number of layers.

5. The method of claim 4, wherein the loss function is selected from the group consisting of a mean-square root, a mean absolute error, a hinge, a binary cross-entropy, and a mean-squared logarithmic error.

6. The method of claim 1 further comprising:
    running the LSTM model to predict measurements in validation data.

7. The method of claim 6 further comprising:
    redeveloping the LSTM model with additional historic process measurements until a $R^2$ value of greater than 0.80 for a predicted value versus true value cross-plot is achieved.

8. A method comprising: setting an autocorrelation threshold for a sensor in a long-short term memory (LSTM) model developed based on historical process measurements from an analogous sensor to a sensor; collecting measured data from the sensor; applying the LSTM model to the measured data from the sensor, wherein applying the LSTM model comprises: applying the LSTM model to the measured data from the sensor to yield LSTM predicted data; calculating key performance indicators (KPIs) of the LSTM data based on an accumulated slow drift error (ASDE) model, wherein the KPIs comprise an error, an accumulated prediction error, an accumulated slow-drift error, and an estimated autocorrelation; and identifying sensor drift when the estimated autocorrelation violates the autocorrelation threshold.

9. The method of claim 8, wherein the KPIs are based on parameters comprising a mean factor for a fraction of rolling standard deviation from a mean, a threshold for an estimated autocorrelation of accumulated slow drift prediction error, and predefined number of samples for a rolling mean and a rolling standard deviation.

10. The method of claim 8 further comprising:
    triggering an alarm when the sensor drift is identified.

11. The method of claim 8 further comprising:
    recalibrating the sensor when the sensor drift is identified.

12. The method of claim 8 further comprising:
    replacing the sensor when the sensor drift is identified.

13. The method of claim 8 further comprising:
    collecting the historical process measurements from the analogous sensor;
    developing the LSTM model, wherein developing comprises:
        selecting training data from the historical process measurements from the analogous sensor;
        creating lookback dataset from the training data with an interval of 5 to 100;
        defining a topology of the LSTM model; and
        training a LSTM network of the LSTM model with the lookback dataset and the topology; and
    setting an autocorrelation threshold for the sensor in the LSTM model.

14. The method of claim 13, wherein developing the LSTM model further comprises normalizing at least one of: the training data, the historical process measurements, and the lookback dataset.

15. The method of claim 13, wherein developing the LSTM model further comprises reshaping the training data into a 3-dimensional tensor.

16. The method of claim 13 further comprising:
    running the LSTM model to predict measurements in validation data.

17. The method of claim 13 further comprising:
    redeveloping the LSTM model with additional historic process measurements until a $R^2$ value of greater than 0.80 for a predicted value versus true value cross-plot is achieved.

* * * * *